United States Patent
Hatfield

(10) Patent No.: US 8,595,458 B2
(45) Date of Patent: Nov. 26, 2013

(54) INTELLIGENT EXTENT INITIALIZATION IN STORAGE ENVIRONMENT

(75) Inventor: Brian David Hatfield, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 12/240,720

(22) Filed: Sep. 29, 2008

(65) Prior Publication Data

US 2010/0082931 A1   Apr. 1, 2010

(51) Int. Cl.
G06F 12/00 (2006.01)

(52) U.S. Cl.
USPC .......................... 711/166; 711/112; 711/113

(58) Field of Classification Search
None
See application file for complete search history.

(56) References Cited

U.S. PATENT DOCUMENTS

| | | | |
|---|---|---|---|
| 6,209,070 B1 | 3/2001 | Reed et al. | |
| 6,574,703 B1 | 6/2003 | Don et al. | |
| 6,910,214 B1 | 6/2005 | Reed et al. | |
| 7,089,392 B2 | 8/2006 | Branch | |
| 7,159,073 B2 | 1/2007 | Longo et al. | |
| 7,243,189 B2 | 7/2007 | Nagasoe et al. | |
| 7,293,137 B2 | 11/2007 | Factor et al. | |
| 7,363,447 B1 | 4/2008 | Ohr | |
| 2003/0014586 A1* | 1/2003 | Mitsuda et al. | 711/112 |
| 2003/0140210 A1 | 7/2003 | Testardi | |
| 2007/0220200 A1* | 9/2007 | Gill et al. | 711/113 |
| 2008/0071993 A1 | 3/2008 | Factor et al. | |
| 2008/0083038 A1* | 4/2008 | Fujii et al. | 726/27 |
| 2008/0235479 A1* | 9/2008 | Scales et al. | 711/166 |

OTHER PUBLICATIONS

Paolo Brunt et al., "Disk Storage Access with DB2 for z/OS," DB2 Information Management Software, Redbooks Paper, IBM Corp., 2006, 52 pages.

* cited by examiner

*Primary Examiner* — Sanjiv Shah
*Assistant Examiner* — Daniel Tsui
(74) *Attorney, Agent, or Firm* — Griffiths & Seaton PLLC

(57) ABSTRACT

A method, apparatus, and computer program product for initializing a plurality of extents in a computing storage environment is provided. A plurality of states for each of the plurality of extents is defined to include either an initialized state or a modified state. The plurality of extents is initialized at an advance time, designating the plurality of extents as having the initialized state. Upon a first occurrence of a destage operation of a first extent of the plurality of extents, the first extent is designated as having the modified state.

19 Claims, 5 Drawing Sheets

INTELLIGENT EXTENT INITIALIZATION IN STORAGE ENVIRONMENT

BACKGROUND OF THE INVENTION

1. Field of the Invention

The present invention relates in general to computers, and more particularly to apparatus, method and computer program product embodiments for initializing extents in a computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To achieve greater storage performance and reliability for customers, a variety of improvements to storage environments continue to be made. One related improvement to the present invention allows for the creation of storage volumes without actually allocating physical storage until necessary. Extents, or contiguous areas of storage on a computer file system, are reserved. The extents are allocated on demand the first time a track is destaged (e.g., moved from cache to disk) to a particular extent.

Storage volumes that implement the foregoing improvement are referred to as extent space efficient (ESE). For ESE volumes, an entire stride (i.e., RAID-efficient portion) on which the stride exists is initialized before the track is destaged from cache to disk. In some situations, an initial state of data on a storage rank is not assumed. As a result, the entire stride must be initialized before the track is written.

Because entire strides must be initialized prior to a write of data, the incoming destage (from cache) must be stalled while the stride is initialized (an additional destage is performed). Stalling storage operations in this regard necessarily affects overall performance and efficiency.

In view of the foregoing, a need exists for a mechanism to alleviate the need to stall storage operations relating to the initialization of extents as described above. Such a mechanism will increase storage performance and reduce or prevent timeouts such as missing interrupt handlers (MIH).

Accordingly, in one embodiment, by way of example only, a method for initializing a plurality of extents in a computing storage environment is provided. A plurality of states is defined for each of the plurality of extents to include either an initialize state or a modified state. The plurality of extents are initialized at an advance time. The plurality of extents are designated as having the initialized state. Upon a first occurrence of a destage operation, a first extent of the plurality of extents is designated as having the modified state.

In an additional embodiment, again by way of example only, a system for initializing a plurality of extents in a computing storage environment is provided. An extent state machine is operable in the computing storage environment. The extent state machine is adapted for defining a plurality of states for each of the plurality of extents to include either an initialized state or a modified state, initializing the plurality of extents at an advance time, designating the plurality of extents as having the initialized state, and upon a first occurrence of a destage operation of a first extent of the plurality of extents, designating the first extent as having the modified state.

In still another embodiment, again by way of example only, a computer program product for initializing a plurality of extents in a computing storage environment is provided. The computer program product comprises a computer-readable storage medium having computer-readable program code portions stored therein. The computer-readable program code portions include a first executable portion for defining a plurality of states for each of the plurality of extents to include either an initialized state or a modified state, a second executable portion for initializing the plurality of extents at an advance time, designating the plurality of extents as having the initialized state, and a third executable portion for, upon a first occurrence of a destage operation of a first extent of the plurality of extents, designating the first extent as having the modified state.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for intelligent initialization of extents in a computing storage environment. Instead of having to stall for each input/output (I/O) operation the first time a destage operation is performed, the illustrated embodiments build a state to the extent to avoid a time penalty caused by the initialization of extends during critical write operations. The illustrated embodiments perform extent initialization at times when a customer expects initialization, such as at a rank creation time, a volume creation time, a volume expansion time, or a volume deletion time, to provide predictable performance. Additionally, only extents that require initialization are initialized, saving bandwidth on the I/O fabric, device adapters, cards, drives, and other storage components in the environment.

Some of the illustrated embodiments as will be described use a state machine to define either an initialized or modified state for a particular extent. The initialized state refers to an extent that is cleared, or is all zeros. The modified state refers to an extent that is not cleared, or is not all zeros. The state of the extent may be configured to be non-volatile in nature. To maintain mainline I/O performance, the state may be cached in memory during runtime. Once a trusted state of an extent is known, the extent need only be initialized when necessary. This allows initializations to be performed at times convenient to the customer. Overall storage performance is increased, as a result.

Figure 1:
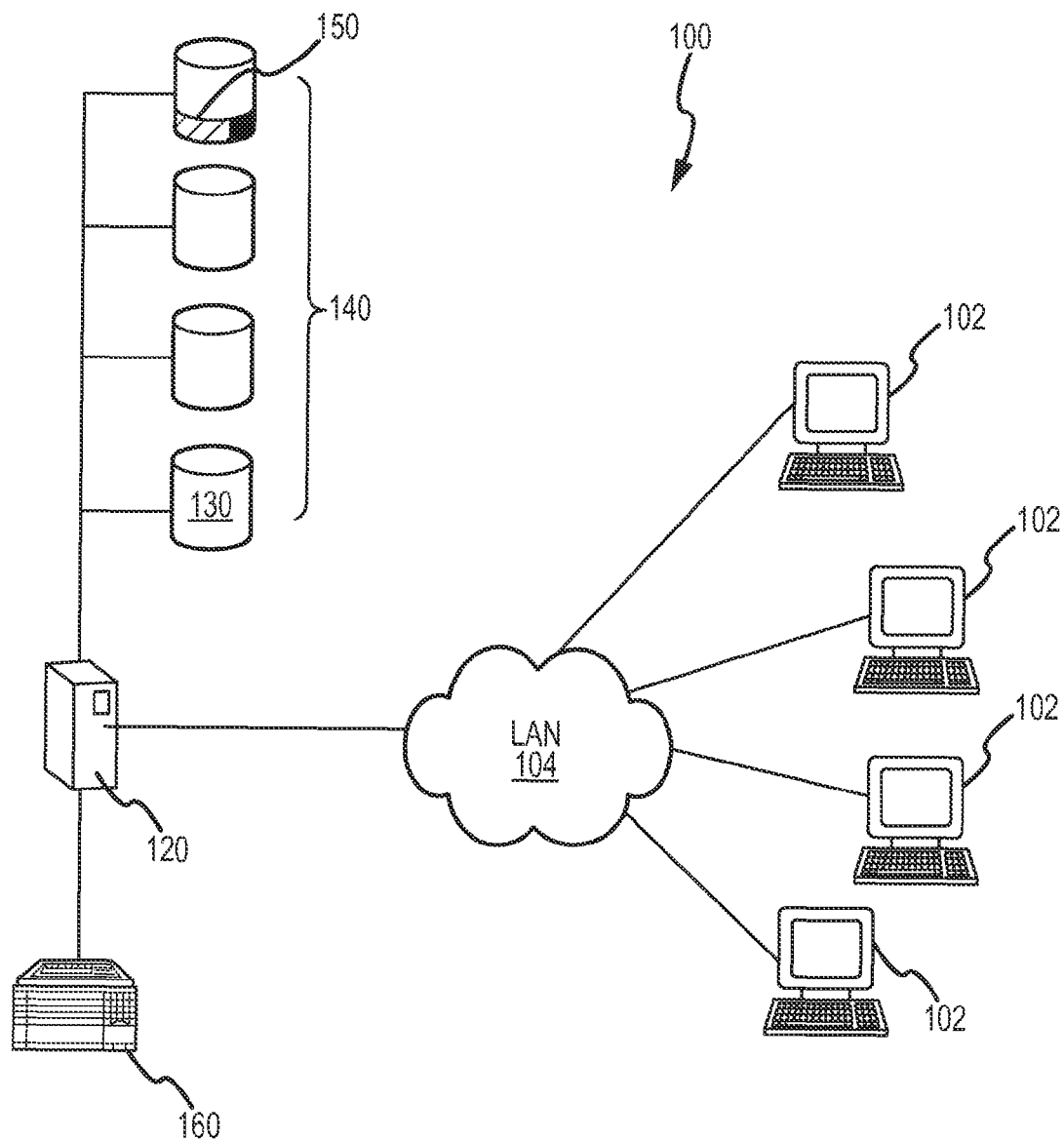
FIG. 1 illustrates an exemplary computer network in the form of a local area network.
Figure 2:
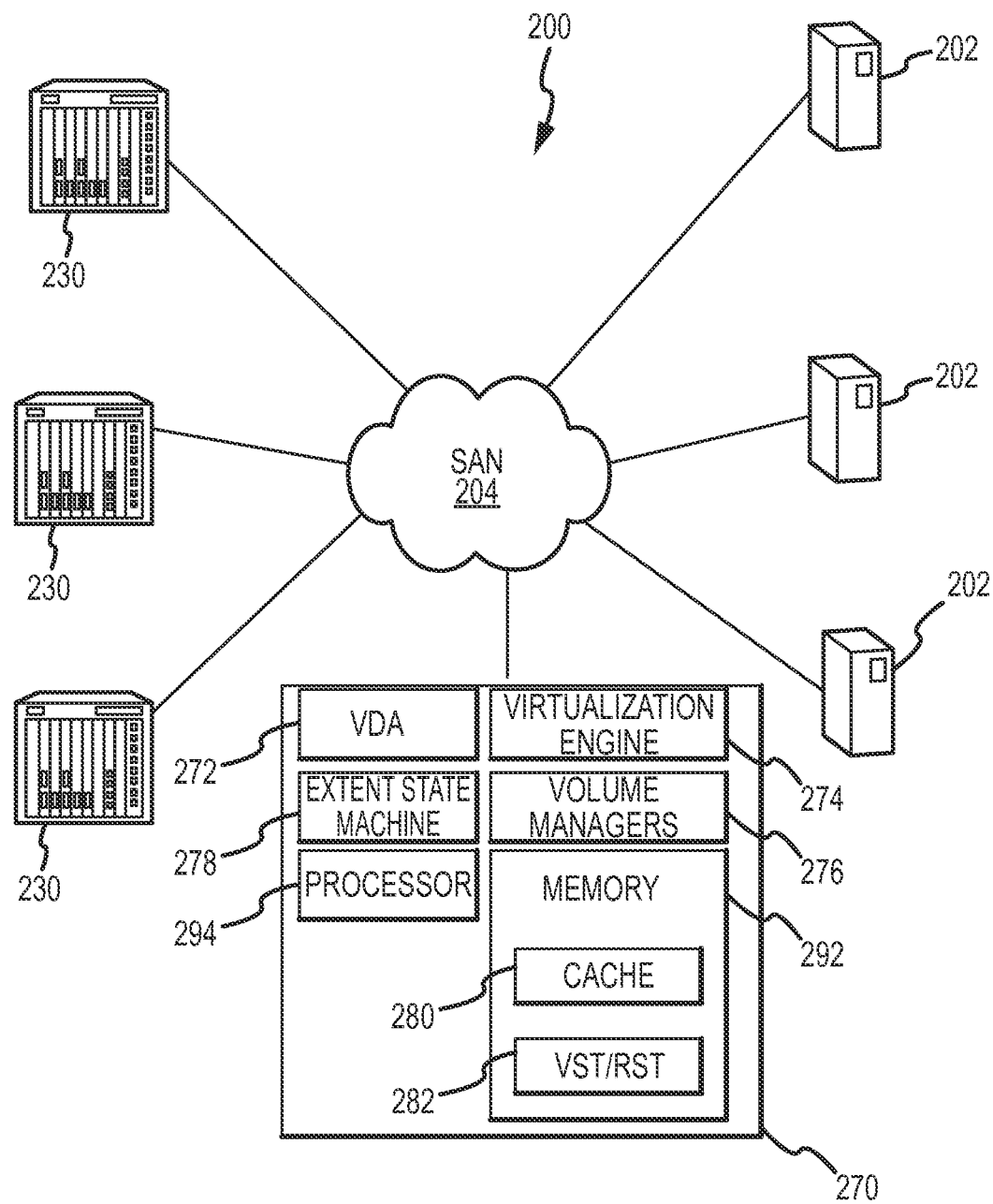
FIG. 2 illustrates an exemplary storage area network (SAN) and associated administrator device.

FIGS. 1 and 2 hereafter provide examples of computing storage environments in which the mechanisms of the following embodiments may be implemented. It should be appreciated, however, that FIGS. 1 and 2 are only exemplary and are not intended to state or imply any limitation as to the particular architectures in which the exemplary aspects of the various embodiments may be implemented. Many modifications to the architecture depicted in FIGS. 1 and 2 may be made without departing from the scope and spirit of the following description and claimed subject matter.

FIG. 1 illustrates a computer network 100 in the form of a local area network (LAN). LAN interconnection 100 may be any number of network topologies, such as Ethernet. Workstation nodes 102 are coupled to a server 120 via a LAN interconnection 104. Data storage, such as a volume 130 is coupled to the server 120. The volumes 130 may be organized in a RAID rank 140. For each volume, a number of extents 150 may be allocated. As the skilled artisan will appreciate, the volumes 130 and rank(s) 140 may be configured physically or virtually (logically).

The network shown in FIG. 1 is known as a client-server model of network. Clients are devices connected to the network that share services or other resources. A server 120 administers these services or resources. A server 120 is a computer or software program, which provides services to clients 102. Services that may be administered by a server include access to storage volumes 130, applications provided by the server 120 or other connected nodes (not shown), or printer sharing 160.

In FIG. 1, workstations 102 are clients of server 120 and share access to volumes 130 that is administered by server 120. When one of workstations 102 requires access to volumes 130, the workstation 102 submits a request to server 120 via LAN interconnect 100. Server 120 services requests for access from workstations 102 to volumes 130. One possible interconnect technology between server and storage is the traditional small computer systems interface (SCSI) interface.

As networks such as shown in FIG. 1 grow, new clients 102 may be added, more storage such as volumes 130 may be added and servicing demands may increase. As mentioned above, server 120 will service all requests for access to volumes 130. Consequently, the workload on server 120 may increase dramatically and performance may decline. To help reduce the bandwidth limitations of the traditional client server model, Storage Area Networks (SAN) have become increasingly popular in recent years. Storage Area Networks interconnect servers and storage at high speeds. By combining existing networking models, such as LANs, with Storage Area Networks, performance of the overall computer network may be improved.

FIG. 2 shows one exemplary embodiment of a SAN 200. Servers 202 are coupled to data storage devices 230 via SAN interconnect 204. Each server 202 and each storage device 230 is coupled to SAN interconnect 204. Servers 202 have direct access to any of the storage devices 230 connected to the SAN interconnect 204. SAN interconnect 204 can be a high speed interconnect, such as Fibre Channel or small computer systems interface (SCSI). In addition, SAN interconnect 204 can be an Internet Small Computers System Interface (iSCSI), a Fiber Connectivity (FICON) storage protocol, or Serial Attached SCSI (SAS) attached storage. As FIG. 2 shows, the servers 202 and storage devices 230 comprise a network in and of themselves.

In the SAN 200 of FIG. 2, no server 202 is dedicated to a particular storage device 230 as in a LAN. Any server 202 may access any storage device 230 on the SAN 200 in FIG. 2. Typical characteristics of a SAN 200 may include high bandwidth, a multitude of nodes per loop, a large connection distance, and a very large storage capacity. Consequently, the performance, flexibility, and scalability of a Fibre Channel based SAN 200 may be significantly greater than that of a typical SCSI based system.

FIG. 2 also shows a network administrator/controller 270 coupled to the SAN interconnect 204. Being able to effectively allocate storage 230 in a SAN 200 in a manner that provides for adequate data protection and recoverability is of particular importance. Because multiple hosts may have access to a particular storage array 230 in a SAN 200, prevention of unauthorized and/or untimely data access is desirable. Zoning is an example of one technique that is used to accomplish this goal. Zoning allows resources to be partitioned and managed in a controlled manner. The administrator 270 may be used to map hosts to storage and provide control to allocation of the storage devices 230.

Current storage products managed and monitored by devices such as an administrator 270 include so-called "point-in-time" copy functionality. Point-in-time copy functionality is a technology in the storage microcode that makes it possible to very rapidly provide a copy (or apparent copy) of a volume without necessarily reading all the data from the source volume and writing it to a target volume. This is done through bitmaps and algorithms which control when data must actually be moved to the target. Point in time copy functionality has provided great advantage in reducing the amount of time that source volumes must have their input/output (I/O) activity quiesced in order to produce consistent target volumes for data backup, archive, or data mining purposes.

In many applications, point-in-time copy functionality need only make a copy of data that is actually changed in the source volumes, yet until recently the entire capacity of the source volumes had to be allocated and reserved for the targets of the functionality. Recent enhancement to various point-in-time copy implementations now allow the target volumes to be much smaller that the space allocated for the source volumes, anticipating that only data that actually gets changed in the source volumes needs to be copied to the target volumes. In these cases, the target volumes are said to be "thin or thinly provisioned."

The administrator 270 may be configured to aid in the selection of storage locations within a large network of storage elements. The administrator 270 includes a storage virtualization optimizer that, according to an embodiment of the present invention, processes input/output in accordance with a customer's specified performance and space requirements, given a level of desired performance, attributes of the user's workload, the varying performance attributes of storage and its response to different types of workloads, and the presence of competing workloads within the network.

The virtual disk allocator (VDA) 272 satisfies requests for storage within the network of storage elements in such a way as to meet the performance requirements specified with the request, or through a storage policy mechanism. The virtual disk allocator 272 can operate in environments such as the IBM 2145 SAN Volume Controller (SAN VC), which is a virtualized storage subsystem. The virtual disk allocator 272 may determine performance characteristics of managed disks. The virtual disk allocator 272 may further determine relationships between managed disks and resource groups based on user defined or automated input, and create a virtual disk that includes a set of the managed disks, taking into consideration the resource groups, and the resource group storage resources such as cache and data paths, to which the managed disks are allocated.

The virtual disk allocator 272 extends the policy-based aspects to Open System Environments and automates the selection of storage elements within virtualized storage subsystems to meet performance requirements. Recommending the selected storage elements within the virtualized storage system allows for optimal usage of striped or composite volumes supported by the OS or Volume Manager software, or applications (such as database applications) which support the concept of striped volumes, such as DB2 and other database products. The virtual disk allocator 272 also extends the notions of allocating storage taking into consideration long-term data usage patterns. The virtual disk allocator 272 incorporates various algorithms required to make intelligent choice of data placement.

The virtual disk allocator 272 may make determinations of which nodes, i.e., engines such as the virtualization engine 274, may access the data, and which managed disk groups (MDGs), groups of disks supporting a virtual disk, would compose the logical disks (LUNs) to be selected. Within the MDG is at least one managed disk, which is used by a virtualization engine 274 and volume manager 276 to stripe data within the virtual disk, which is comparable to logical disks in Enterprise Storage Systems (ESS). The virtual disk allocator 272 can thus select a LUN or a plurality of LUNs in multiple resource groups across multiple storage elements in order to meet the customer's desired level of performance A virtualization engine 274 and volume manager 276 may be used to stripe data within a virtual disk across managed disks. The virtualization optimizer may make determinations of which nodes, i.e., engines such as the virtualization engine 274, may access the data, and which managed disk groups (groups of disks) would compose the LUNs to be selected. An additional important application of this would be to use the virtualization optimizer to determine how to relocate, e.g., nodes or managed disk groups, the LUNs, i.e., virtual disks, to meet the customer's desired level of performance.

Administrator 270 is shown including a memory module 292 and a processor 294. Processor 294 may execute instructions to perform various mechanisms as will be further illustrated. The instructions to implement these mechanisms or performance data processed by these mechanisms may be stored in memory module 292. Memory module 292 includes a cache 280 and a volume segment table/rank segment table (VST/RST) 282. Memory 292 may, as the skilled artisan will appreciate, be physically located apart from administrator 270. Memory 292 may include a non-volatile storage (NVS) device having a battery or system disk backup.

Extent state machine 278 is operational on the administrator 270, or elsewhere within the environment 200. As the skilled artisan will appreciate, extent state machine 278 may be implemented using a variety of mechanisms, such as hardware, firmware, software, or a combination thereof. For example, extent state machine 278 may be implemented by host adapter or drive firmware in communication with administrator 270. Extent state machine 278 builds states to the storage extents as will be further described. Extent state machine may define and implement states for each extent in the environment 200. In one exemplary embodiment, extent state machine 278 may operate by clearing (zeroing) all extents within a rank and designating the extents as initialized at a rank creation time. At the first destage of a particular extent, the extent's state may be designated as modified. Modified extents may be cleared (zeroed) and re-designated as initialized when a rank is deleted. In an additional exemplary embodiment, extent state machine 278 may zero all extents within a volume, designating their states as initialized when the volume is created or expanded. Again, upon a first destage, the extent(s) may be designated as modified. The extents may be cleared and re-designated as initialized when the volume is deleted. In this manner, extents are initialized only when necessary, and at a time when customers expect them to be.

The extent state is preserved in non-volatile memory, and may be stored in a variety of locations. For example, the extent state may be stored in extent metadata (one for each customer data extent, logically located at the end of each rank), global data (global DA data replicated on up to 3 ranks), NVS (main memory backed by battery/system disk as previously described), and in Array or disk drive module (DDM) specific metadata. Taking the assumption that only unmodified data is destaged (so that a track that is cleared is not unnecessarily destaged), such state designations may be performed for every destage related to a particular extent. The extent state may correspondingly be updated in NVS.

In additional embodiments, a conditional check of an extent state may be made. In this case, the state may be designated as initialized if the current extent state shows modified. Using this approach, assuming that the state information is stored in metadata for each rank, for each time a destage operation is performed, it is necessary to determine if the extent has been initialized. The metadata track may be staged into cache, and then updated, involving an additional write operation to NVS and a destage of the metadata at an appropriate time.

Use of the above approach with global data, however, may be potentially more efficient. A bit may be used in the VST/RST in memory to designate extent state. Since the location of a particular extent on a rank is determined by looking up information in the VST/RST, it is possible to easily check and re-designate extent states in this location. In addition, this approach also provides the state of the extent in cache. In order to improve performance, the extent state may be cached in NVS, periodically destaging updates to global data.

State transitions from modified to initialized could either be done one at a time, or in batches of (n) extents (saving updates to NVS). Since state transitions from modified to initialized may occur in large batches (rank creation or volume creation/expansion/deletion), batching is appropriate to reduce I/O to NVS. If the extent state machine is interrupted when a volume delete or create (whichever zeros the extents) is in progress, the zeroing for all extents may resume the zeroing for all extents in that volume still in the modified state therefore improving performance further without compromising the integrity of the state machine.

Figure 3:
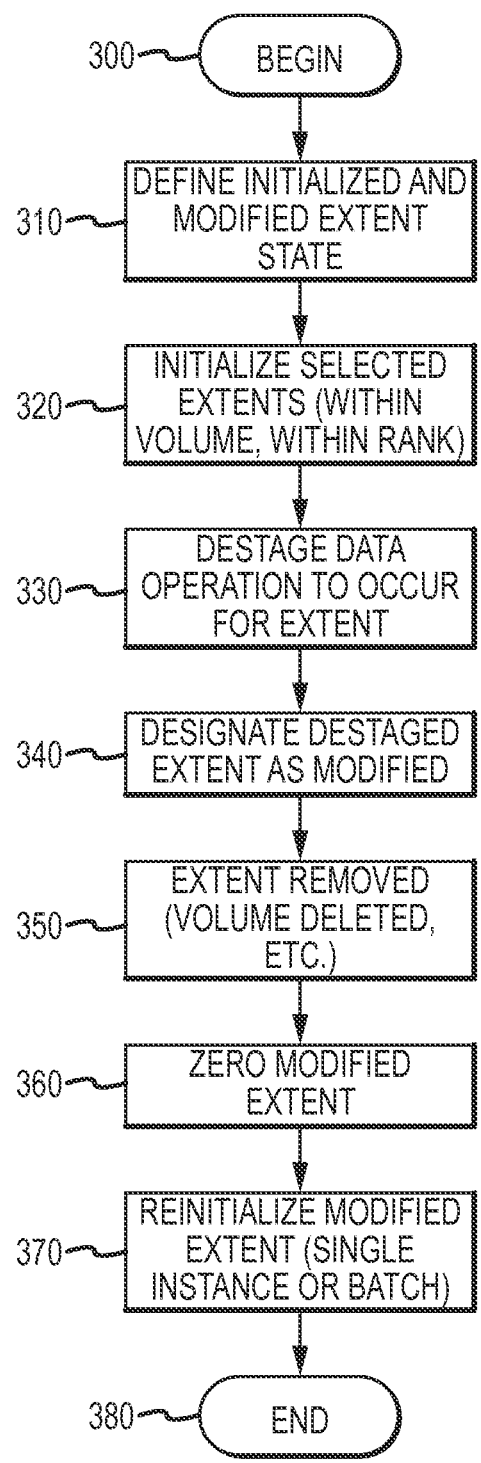
FIG. 3 illustrates a first exemplary method for initializing extents in a computer storage environment such as a SAN.
Figure 4:
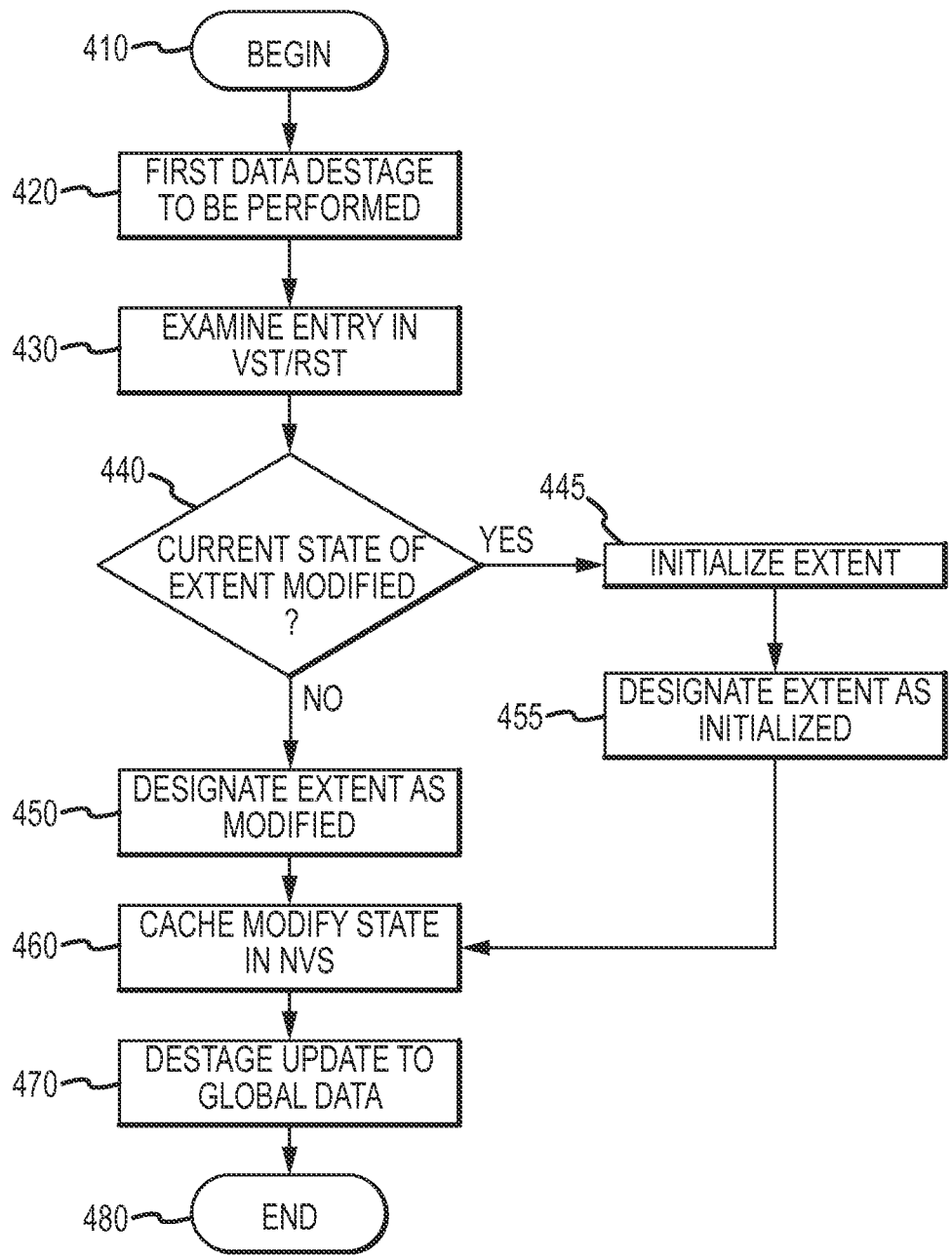
FIG. 4 illustrates a second exemplary method for initializing extents in a computer storage environment.

Turning to FIG. 3, an exemplary method is depicted for initialization of extents in light of the foregoing discussion. FIG. 4 shows an additional exemplary method in this same regard. As one skilled in the art will appreciate, various steps in the methods may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. In addition and as previously described, while the methods relates specifically to point-in-time copy functionality, various steps in the methods may be adapted for provisioning of storage in other scenarios and implementations.

The method of FIG. 3 begins (step 300) by defining initialized and modified states (step 310). As previously indicated, each of the extents may be designated as either initialized or modified. At an advance time, such as rank creation or volume creation or expansion, one or more extents associated with the rank(s) or volume(s) are initialized (step 320). At step 330, a first destage operation is poised to occur for one or more of these extents (extent(s) to which data will be destaged) (step 330).

As a next step, the destaged extent is designated as modified (the extent state is changed from initialized to modified) (step 340). At a later time, the extent is removed (such as by volume or rank deletion) (step 350). The modified extent is zeroed (step 360), and re-designated as initialized (step 370). The re-designation may occur on an individual or batch basis as previously indicated. The method then ends (step 380), although the skilled artisan will appreciate that while the instant method shows states beginning on rank or volume creation, the method may be further continued, as state information may persist (may be preserved) across rank or volume deletions.

Turning to FIG. 4, an additional exemplary method for initializing extents is presented. The method begins (step 410) with a point in time where a first data destage to a particular extent is to be performed (step 420). The bit entry in the VST/RST is examined to determine the extent state (step 430). If the current state of the extent is modified (step 440), then the extent is zeroed (step 445) and designated as initialized (step 455).

If the current state of the extent is initialized (again, step 440), the extent is designated as modified (step 450), and the cache in NVS is updated to reflect the change (step 460). The update is destaged to global date (step 470), and the method ends (step 480).

Figure 5:
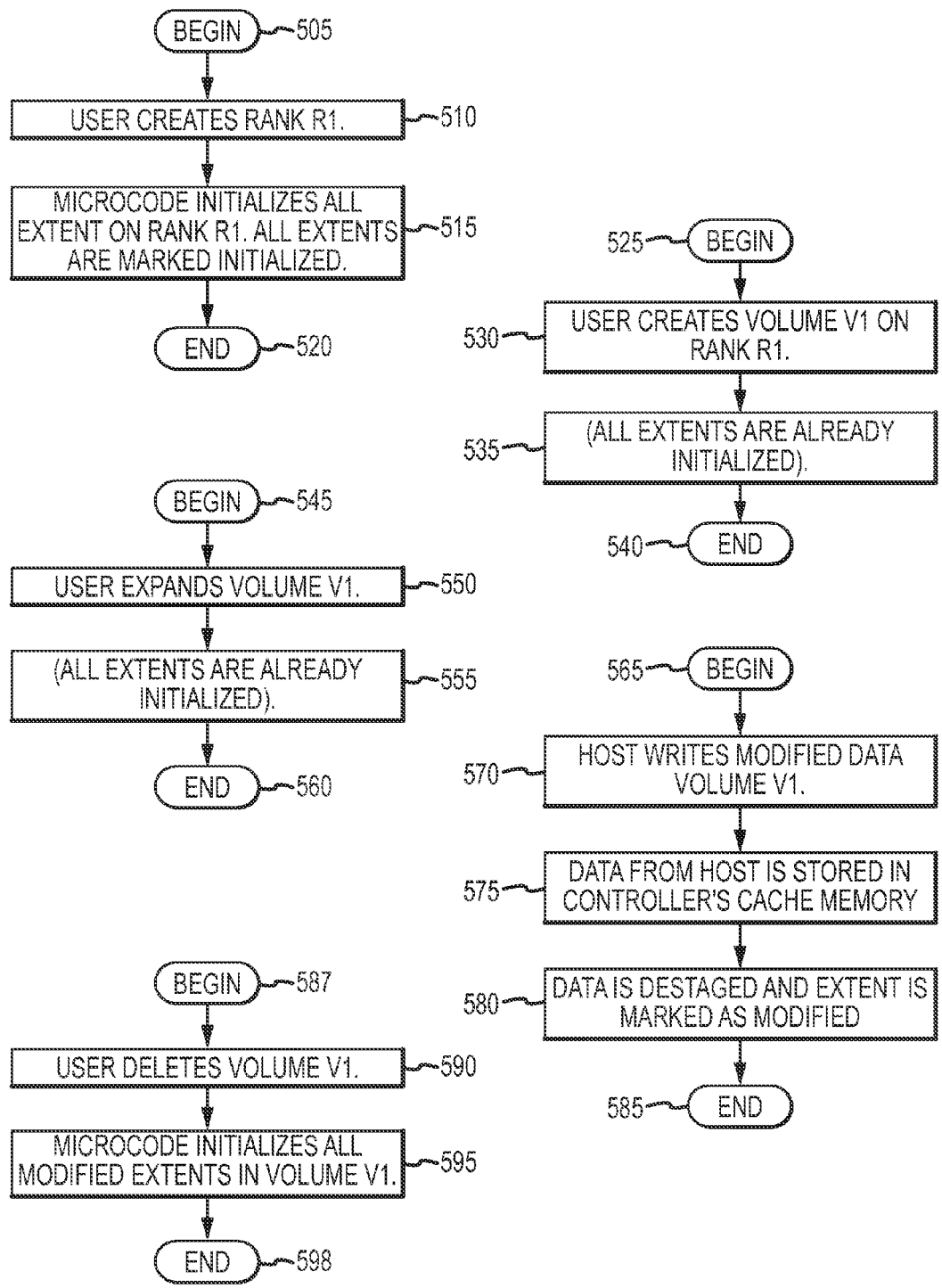
FIG. 5 illustrates a variety of methods for configuring a computer storage environment, depicting effects of the extent initialization functionality of the present invention on the configuration methods.

FIG. 5 illustrates several scenarios for managing storage, showing the effects of the initialization functionality previously described. An exemplary rank creation begins (step 505) with the user creating a rank R1 (step 510). Microcode initializes all extents on the rank R1. The extents are designated as initialized (step 515), and the rank creation ends (step 520).

An exemplary volume creation begins (step 525) with a user creating a volume V1 on rank R1 (step 530). In this case, all extents have been initialized previously (pursuant to the rank creation) (step 535). The volume creation ends (step 530).

An exemplary volume expansion begins (step 545) with a user expanding volume V1 (step 550). Here again, the relevant extents have already been initialized pursuant to rank creation (step 555), and the volume expansion ends (step 560).

An exemplary write to modified data begins (step 565) with a host writing modified data on volume V1 (step 570). Data from the host is stored in the controller's cache memory (step 575). Data is destaged, and the extent is designated as modified (step 580), and the write ends (step 585).

An exemplary volume deletion begins (step 587) with a user deleting volume V1 (step 590). Microcode initializes all modified extents in the volume V1 (step 595), and the volume deletion ends (step 598).

Various aspects of the foregoing illustrated embodiments may be useful in storage environments that manage storage on several different levels, such as volume, rank, adapter, array, DDM, etc., where storage may be physically initialized multiple times for different configuration operations (such as rank creation, volume deletion, etc.). By maintaining a state machine, redundant initialization may be eliminated. This is especially applicable for rapid-provisioning environments where storage such as volumes are created and deleted on a frequent basis.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for initializing a plurality of extents in a computing storage environment, comprising:

defining a plurality of states for each of the plurality of extents to include either an initialized state or a modified state;

initializing selected ones of the plurality of extents at an advance time, designating the selected ones of the plurality of extents as having the initialized state, wherein the initializing the selected ones of the plurality of extents at the advance time includes initializing each of the selected ones of the plurality of extents within a rank at one of a rank creation time, a volume at a volume creation, and a volume expansion time;

prior to a first occurrence of a destage operation of a first extent of the plurality of extents, determining one of the plurality of states for the first extent of the plurality of extents, wherein an entry in a Volume Segment Table/Rank Segment Table (VST/RST) is examined to determine the one of the plurality of states for the first extent of the plurality of extents;

designating the first extent as having the initialized state if the first extent of the plurality of extents is designated as having the modified state;

upon the first occurrence of the destage operation of the first extent of the plurality of extents, designating the first extent as having the modified state;

upon a deletion of the rank, reinitializing only the plurality of extents having the modified state; and upon a deletion of the volume, reinitializing only the plurality of extents having the modified state, wherein the plurality of extents having the modified state are reinitialized in one of a single instance and a batch.

2. The method of claim 1, further including storing the plurality of states in extent metadata, one for each of the plurality of extents, storing the plurality of states in global data, or storing the plurality of states in non-volatile storage (NVS).

3. The method of claim 1, wherein designating the plurality of extents as having the initialized state includes marking a bit in each entry of the Volume Segment Table/Rank Segment Table (VST/RST) in main memory.

4. The method of claim 1, further including caching each of the plurality of states in non-volatile storage (NVS) during a runtime operation of the first extent.

5. The method of claim 1, further including, pursuant to the reinitializing, designating the plurality of extents within the volume as having the initialized state.

6. The method of claim 1, further including, in conjunction with the initializing the plurality of extents at an advance time, designating the plurality of extents as having the initialized state for the plurality of extents in at least one of the volume at the volume creation and volume expansion time pursuant to the initializing the plurality of extents for the rank at a rank creation time.

7. A system for initializing a plurality of extents in a computing storage environment, comprising:

an extent state machine operational within the computing storage environment, wherein the extent state machine is adapted for:

defining a plurality of states for each of the plurality of extents to include either an initialized state or a modified state, initializing selected ones of the plurality of extents at an advance time, designating the selected ones of the plurality of extents as having the initialized state, wherein the initializing the selected ones of the plurality of extents at the advance time includes initializing each of the selected ones of the plurality of extents within a rank at one of a rank creation time, a volume at a volume creation, and a volume expansion time, prior to a first occurrence of a destage operation of a first extent of the plurality of extents, determining one of the plurality of states for the first extent of the plurality of extents, wherein an entry in a Volume Segment Table/Rank Segment Table (VST/RST) is examined to determine the one of the plurality of states for the first extent of the plurality of extents, designating the first extent as having the initialized state if the first extent of the plurality of extents is designated as having the modified state, upon a deletion of the rank, reinitializing only the plurality of extents having the modified state, and upon a deletion of the volume, reinitializing only the plurality of extents having the modified state, wherein the plurality of extents having the modified state are reinitialized in one of a single instance and a batch.

8. The system of claim 7, wherein the extent state machine is further adapted for storing the plurality of states in extent metadata, one for each of the plurality of extents, storing the plurality of states in global data, or storing the plurality of states in non-volatile storage (NVS).

9. The system of claim 7, wherein the extent state machine is further adapted for marking a bit in each entry of the Volume Segment Table/Rank Segment Table (VST/RST) in main memory.

10. The system of claim 7, wherein the extent state machine is further adapted for caching each of the plurality of states in non-volatile storage (NVS) during a runtime operation of the first extent.

11. The system of claim 7, wherein the extent state machine is further adapted for, pursuant to the reinitializing, designating the plurality of extents within the volume as having the initialized state.

12. The system of claim 7, wherein the extent state machine is further adapted for, in conjunction with the initializing the plurality of extents at an advance time, designating the plurality of extents as having the initialized state for the plurality of extents in at least one of the volume at the volume creation and volume expansion time pursuant to the initializing the plurality of extents for the rank at a rank creation time.

13. A computer program product for initializing a plurality of extents in a computing storage environment, the computer program product comprising a non-transitory computer-readable storage medium having computer-readable program code portions stored therein, the computer-readable program code portions comprising:

a first executable portion for defining a plurality of states for each of the plurality of extents to include either an initialized state or a modified state;

a second executable portion for initializing selected ones of the plurality of extents at an advance time, designating the selected ones of the plurality of extents as having the initialized state, wherein the initializing the selected ones of the plurality of extents at the advance time includes initializing each of the selected ones of the plurality of extents within a rank at one of a rank creation time, a volume at a volume creation, and a volume expansion time;

a third executable portion for, prior to a first occurrence of a destage operation of a first extent of the plurality of extents, determining one of the plurality of states for the first extent of the plurality of extents, wherein an entry in a Volume Segment Table/Rank Segment Table (VST/RST) is examined to determine the one of the plurality of states for the first extent of the plurality of extents;

a fourth executable portion for designating the first extent as having the initialized state if the first extent of the plurality of extents is designated as having the modified state;

a fifth executable portion for, upon the first occurrence of the destage operation of the first extent of the plurality of extents, designating the first extent as having the modified state;

a sixth executable portion for, upon a deletion of the rank, reinitializing only the plurality of extents having the modified state; and a seventh executable portion for, upon a deletion of the volume, reinitializing only the plurality of extents having the modified state, wherein the plurality of extents having the modified state are reinitialized in one of a single instance and a batch.

14. The computer program product of claim 13, further including an eighth executable portion for storing the plurality of states in extent metadata, one for each of the plurality of extents, storing the plurality of states in global data, or storing the plurality of states in non-volatile storage (NVS).

15. The computer program product of claim 13, further including an eighth executable portion for marking a bit in each entry of the Volume Segment Table/Rank Segment Table (VST/RST) in main memory.

16. The computer program product of claim 13, further including an eighth executable portion for caching each of the plurality of states in non-volatile storage (NVS) during a runtime operation of the first extent.

17. The computer program product of claim 13, further including an eighth executable portion for, pursuant to the reinitializing, designating the plurality of extents within the volume as having the initialized state.

18. The computer program product of claim 13, further including an eighth executable portion for, in conjunction with the initializing the plurality of extents at an advance time, designating the plurality of extents as having the initialized state for the plurality of extents in at least one of the volume at the volume creation and volume expansion time pursuant to the initializing the plurality of extents for the rank at a rank creation time.

19. A method for initializing a plurality of extents in a computing storage environment, comprising:

defining a plurality of states for each of the plurality of extents to include either an initialized state or a modified state;

initializing the plurality of extents at an advance time, designating the plurality of extents as having the initialized state, wherein the initializing the plurality of extents at the advance time includes initializing each of the plurality of extents within a rank at a volume expansion time;

prior to a first occurrence of a destage operation of a first extent of the plurality of extents, determining one of the plurality of states for the first extent of the plurality of extents, designating the first extent as having the initialized state if the first extent of the plurality of extents is designated as having the modified state;

upon the first occurrence of the destage operation of the first extent of the plurality of extents, designating the first extent as having the modified state;

upon a deletion of the rank, reinitializing only the plurality of extents having the modified state; and upon a deletion of the volume, reinitializing only the plurality of extents having the modified state.

\* \* \* \* \*